No. 812,453. PATENTED FEB. 13, 1906.
J. A. RICKABAUGH.
PORTABLE ICE CRUSHER.
APPLICATION FILED DEC. 10, 1904.

2 SHEETS—SHEET 1.

WITNESSES. INVENTOR.

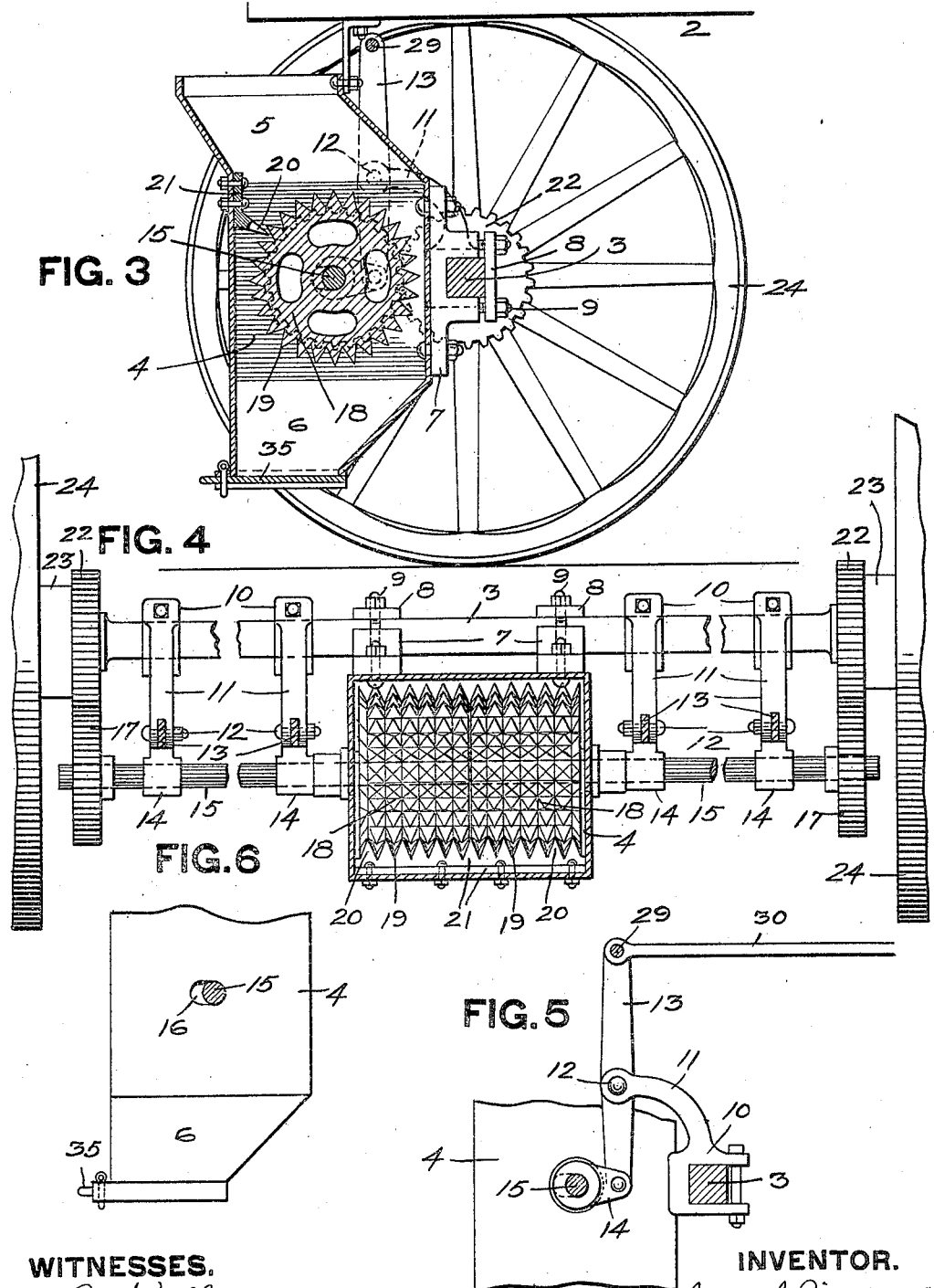

UNITED STATES PATENT OFFICE.

JUSTUS A. RICKABAUGH, OF ALTOONA, PENNSYLVANIA, ASSIGNOR OF ONE-HALF TO WILLIAM MILLIGAN, OF ALLEGHENY CITY, PENNSYLVANIA.

PORTABLE ICE-CRUSHER.

No. 812,453. Specification of Letters Patent. Patented Feb. 13, 1906.

Application filed December 10, 1904. Serial No. 236,353.

*To all whom it may concern:*

Be it known that I, JUSTUS A. RICKABAUGH, a resident of Altoona, in the county of Blair and State of Pennsylvania, have invented a new and useful Improvement in Portable Ice-Crushers; and I do hereby declare the following to be a full, clear, and exact description thereof.

My invention relates to portable ice-crushers, its object being to provide means for supplying crushed ice from ice-delivery wagons as it may be needed at the place of use.

To these ends my invention comprises the novel features hereinafter set forth and claimed.

To enable others skilled in the art to make and use my invention, I will describe the same more fully, referring to the accompanying drawings, in which—

Figure 1:
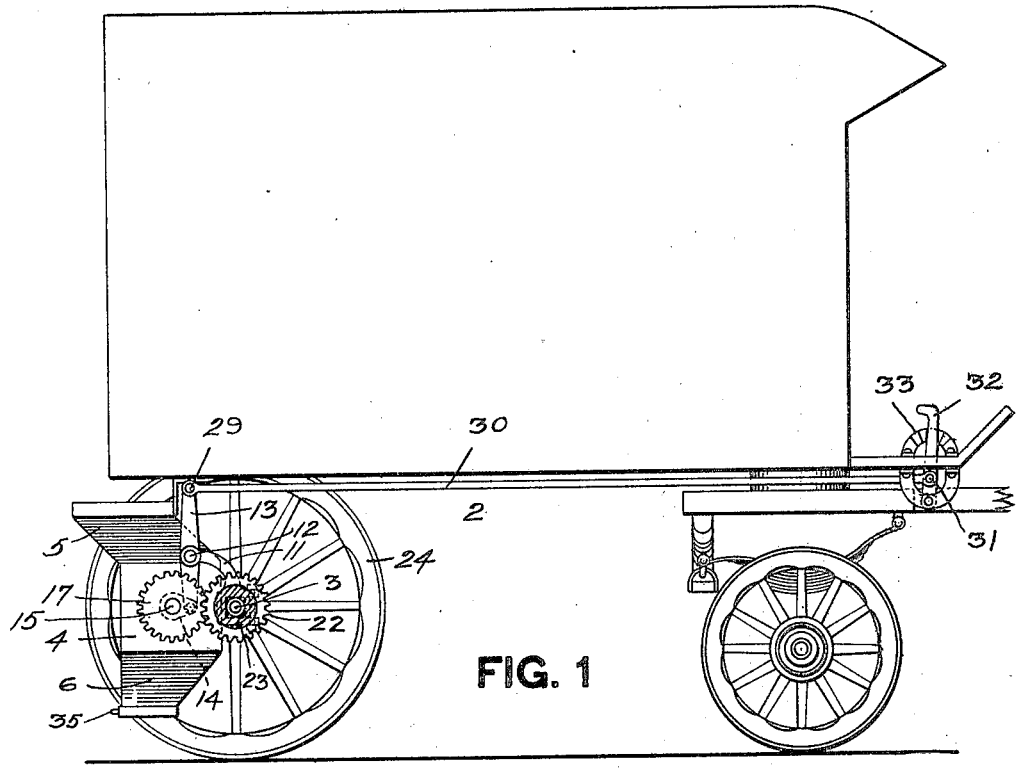
Figure 2:
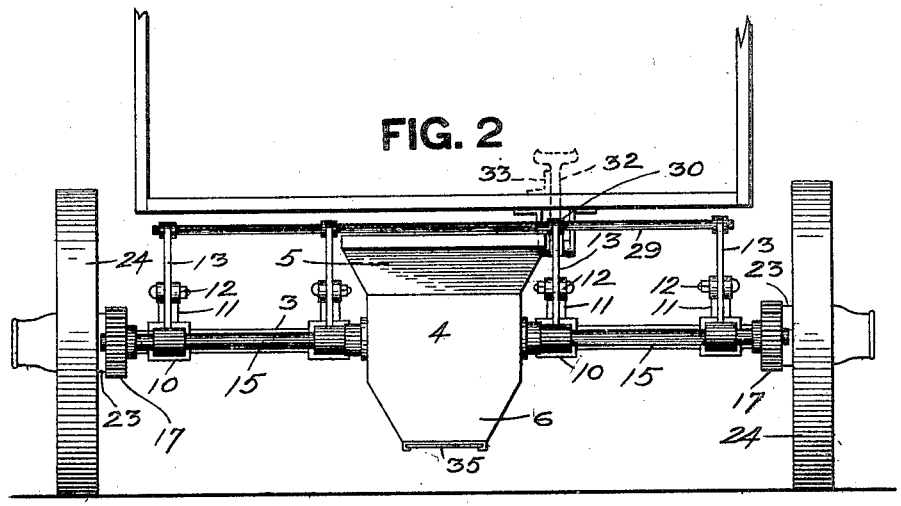
Figure 7:
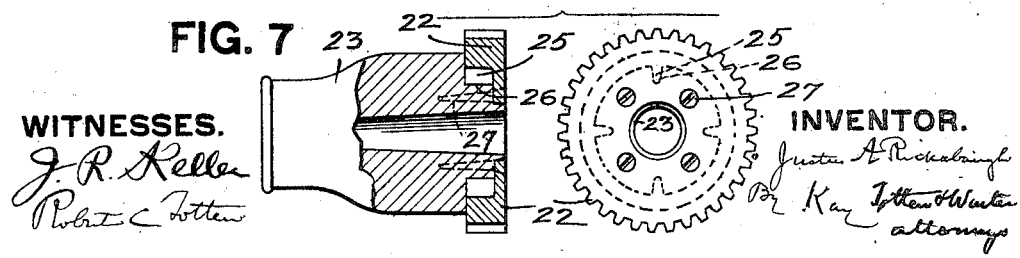

Figure 1 is a side view of a vehicle with my invention applied thereto. Fig. 2 is an end view thereof. Fig. 3 is a sectional view of the crusher, showing its attachment to the vehicle. Fig. 4 is a plan view, the box inclosing the crusher being shown in section, as well as the operating-levers; and Figs. 5, 6, and 7 are detail views.

Like numerals indicate like parts in each of the figures.

The numeral 2 designates any suitable vehicle, that shown being an ordinary ice-wagon adapted to be drawn by horses, although it is evident that my invention may be applied to a motor-driven vehicle as well. Mounted on the rear axle 3 of the wagon is the box or casing 4, said box comprising the hopper portion 5 and the discharge-chute 6. Secured to the rear face of the box 4 are the brackets 7, which engage the axle 3, while plates 8 and bolts 9 secure said brackets firmly to the axle 3. Secured to the axle 3 are the brackets 10, at suitable intervals said brackets having the arms or projections 11. Pivoted at 12 to the brackets 11 are the levers 13, the lower ends of said levers being connected to the lugs 14 on the shafts 15. These shafts 15 run through an elongated opening 16 in the box 4, and to the ends of said shafts are secured the gear-wheels 17. At the opposite ends of the shafts 15 and inclosed within the box 4 are the corrugated rollers 18, with the teeth 19. These teeth 19 mesh with the stationary teeth 20 on the plate 21, secured within the box 4, so that when the rollers 18 are driven they will act to shred or crush any ice introduced into the hopper 5 of said box.

The gear-wheels 17 are adapted to mesh with the gear-wheels 22, secured to the hubs 23 of the wheels 24. In order to secure the gear-wheels 22 to the hubs 23 so that said gear-wheels will be mounted securely thereon, said gear-wheels are provided with the inwardly-projecting prongs 25, which are adapted to engage seats 26, formed in the inner face of the hub, and thus unite the gear-wheels securely with the hub, so that said gear-wheels will rotate with said hub. Screws 27 may also be employed to aid in securing the gears 22 to the hubs 23, said screws passing through the openings in said gears and entering into the body of the hub. In this manner as the wheels revolve rotation will be imparted to the gears 22.

The upper ends of the levers 13 are connected to the shaft 29, and connected to said shaft 29 is the rod 30, which extends to the front end of the wagon, where it is secured at 31 to the foot-lever 32, said foot-lever being in position to be operated by the driver of the wagon. This foot-lever 32 is adapted to engage the toothed rack 33, which acts to hold said lever in any desired position.

It is often required in delivering ice to barrooms, hotels, and other places that the ice be crushed, and this has usually been done by hand when the ice was delivered in large blocks at the place of delivery by hammering the ice with a sledge or other heavy instrument. By my invention the ice can be dumped into the hopper 5, and in traveling from one place to the other the process of crushing is accomplished, so that the ice is ready to be delivered crushed at the point of delivery. Accordingly the driver in passing from one point to another releases the foot-lever 32 and throws it backward into such position that the upper ends of the levers 13 will be thrown backward and the lower ends forward to bring the gear-wheels 17 into engagement with the gear-wheels 22 on the hubs. In this manner when the wagon is in motion power will be transmitted from the wheels of the wagon to the shaft 15 and a rotary movement imparted to the rolls 18. These rolls 18 moving in conjunction with the fixed teeth 20 will act to crush or shred the ice introduced into the box 4, and this ice as it is crushed will fall down to the bottom thereof, whence it may be drawn off by opening the sliding door 35. When sufficient ice has been crushed, the driver by advancing the foot-lever 32 and securing it in position in the rack 33 throws the gears 17 out of engagement with the gears 22, and the rotation of the crushing-rolls ceases. The box 4 thus forms a storage-receptacle for the ice as it is crushed, and the ice is thus carried to the place of delivery. In this manner crushed ice may be delivered at any desired point, the crushing being done in going from one point to another, so that no time is lost and at the same time all the labor and inconvenience of breaking up the ice by hand when the point of delivery is reached is avoided.

What I claim is—

1. The combination with a suitable vehicle, of a receiving and storage box below the bed of said vehicle and carried thereby, a shaft suspended from said vehicle passing through enlarged openings in said box, clutch mechanism between said shaft and the vehicle-wheel, means for moving said shaft to effect the engagement of said clutch mechanism, ice-crushing mechanism on said shaft and means for rotating said shaft by the movement of said vehicle.

2. The combination with a suitable vehicle, of a receiving and storage box below the bed of said vehicle and carried thereby, a shaft suspended from said vehicle and passing through enlarged openings in said box, ice-crushing mechanism within said box carried by said shaft, a gear-wheel on said shaft, a gear-wheel on the vehicle-wheel, and means for throwing said first-named gear into and out of engagement with said second gear.

3. The combination with a suitable vehicle, of a receiving and storage box below the bed of said vehicle and carried thereby, a suspended shaft extending through enlarged openings formed in said box, a toothed crushing-roll on said shaft, and projecting teeth in said box with which the teeth on said crushing-roll mesh, and means for throwing said shaft into and out of engagement with the vehicle-wheel.

4. The combination with a suitable vehicle, of a receiving and storage box below the bed of said vehicle and carried thereby, a suspended shaft passing through enlarged openings in said box, a toothed crushing-roll carried by said shaft within said box, projecting teeth in said box with which the teeth of said crushing-roll mesh, a gear-wheel on said shaft, a gear on the vehicle-wheel, a lever connected to said shaft adapted to throw said gears into and out of engagement with each other.

5. The combination with a suitable vehicle, of a receiving and storage box below the bed of said vehicle at the rear thereof and carried thereby, a suspended shaft passing through enlarged openings in said box, a toothed crushing-roll carried by said shaft, projecting teeth in said box with which the teeth of said crushing-roll mesh, clutch mechanism between said shaft and the vehicle-wheel for throwing said shaft into and out of operative engagement with said wheel, a lever at the forward end of said vehicle, and connections between said clutch mechanism and said lever.

In testimony whereof I, the said JUSTUS A. RICKABAUGH, have hereunto set my hand.

JUSTUS A. RICKABAUGH.

Witnesses:
ROBERT C. TOTTEN,
G. C. RAYMOND.